Patented Jan. 12, 1954

2,666,018

UNITED STATES PATENT OFFICE 2,666,018

VITAMIN ASSAY MEDIUM

John F. Roland, Jr., Chicago, and Anthony M. Gross, Oswego, Ill., assignors to Armour and Company, Chicago, Ill., a corporation of Illinois No Drawing. Application March 8, 1947, Serial No. 733,432

2 Claims. (Cl. 195—100)

This invention relates to the preparation of a microbiological assay medium and more particularly to such a medium which is suitable for turbidimetric determinations.

For several years it has been recognized that certain vitamins such as riboflavin or nicotinic acid are indispensable for the growth of *Lactobacillus casei*. Therefore a growth response caused by the addition of any material to a riboflavin-free medium containing such bacteria is regarded as a reliable qualitative and quantitative indication of the particular vitamin in that material.

To quantitatively follow the multiplication rate of the *Lactobacillus casei*, several methods are in current use. Most commonly used are the titrimetric and the turbidimetric. In the former method the unknown substance is added to a solution of the prepared medium which has previously been sterilized at 15 lbs. pressure and 120° C. for 10 minutes. This is then aseptically inoculated with a drop of pure *Lactobacillus casei* culture. A certain time is allowed for the bacteria to incubate and multiply, thereby producing lactic acid as a waste product. The amount of acid formed is determined by direct titration with a standard sodium hydroxide solution. It has been found that the amount of acid produced is proportional to the rate of growth and the number of bacteria produced.

The turbidimetric method involves adding various increments of the unknown substance to the basal medium. This mixture is then heated to destroy any extraneous bacteria. Next the sterile medium is inoculated with pure Lactobacillus culture. After some time has been allowed for incubation at a constant temperature, the test media cultures are appropriately diluted with distilled $H_2O$ and transferred to calibrated cuvettes, and are read in the spectrophotometer which allows a certain amount of light to pass through the cuvette. The density of bacterial growth is read directly as the per cent of light transmission through the cuvette.

Heretofore in the preparation of vitamin assay media the practice has been to mix with casein all the nutrilites and vitamins necessary for the growth of the bacteria except for the vitamin which is to be tested.

We set ourselves to the problem of preparing an improved assay medium. We desired to provide a medium which outlines materials readily available at low cost and which will provide an active bacterial response.

We have now discovered that an improved medium can be prepared which utilizes the liver residue product left after extraction of anti-anemic principles therefrom. It is common pharmaceutical practice to hash and grind the mammalian livers (for example, from cattle, hogs or sheep) and extract them with water at about 80° C. to prepare a liquid product containing anti-anemic principles. The liver residue left by this extraction is readily available in quantity and we have found how to use this liver residue material in place of casein in the preparation of an improved assay medium.

In preparing our improved medium the liver residue is digested with trypsin and the vitamins removed therefrom by the addition of activated charcoal with repeated washings and filtering. The required nutrilites and vitamins are then added to the liver protein.

The liver residue is a cheap source of protein which lends itself to the removal of vitamins, and we are able to show that the *Lactobacillus casei* exhibit an increased growth rate stimulation in its presence. This is important because it indicates that the complete nutritive elements are present in this protein in an enhanced fashion.

However, we have found that it is not possible to prepare a medium suitable for use in turbidimetric studies simply by direct substitution of digested liver residue for a similarly digested casein product in the usual process of preparation. Such direct substitution yields only a very cloudy medium not suitable for turbidimetric study. We have found that this difficulty can be overcome by introducing an added heating step and a filtration step in the process.

To illustrate the improved process we give the following specific example:

EXAMPLE

Three solutions, which we call A, B and C, were prepared as follows:

Solution A

To a solution containing 2–5% of liver residue hydrolysate in 1600 cc. of water is added 10 gms. of $K_2HPO_4$, 10 gms. of $KH_2PO_4$, 400 mg. of cystine and 80 cc. of a mixture of 10 gms. $MgSO_4.7H_2O$, 0.5 gm. NaCl, 0.50 gm. $FeSO_4.7H_2O$ and 2.0 gms. $MnSO_4.4H_2O$ in 250 cc. water. This is then neutralized to pH 6.8–7.0 with 10 N NaOH and diluted to 2 liters. This solution is then preheated to 100° C. for about three minutes and filtered.

Solution B

A stock solution had been prepared containing 1 mg. per cc. each of adenine sulfate, guanine hydrochloride, and uracil. This was stored in a refrigerator until used.

Solution C

A solution had been prepared containing sufficient of each vitamin necessary for the growth of *Lactobacillus casei*. These are p-aminobenzoic acid, biotin, calcium pantothenate, folic acid, nicotinic acid, pyridoxine HCl, riboflavin, thiamine HCl. The vitamin to be determined is omitted. This solution may also be kept in the refrigerator until used.

To prepare the medium for fifty assay tubes we mixed 250 cc. of Solution A with 5 cc. of Solution B and 1 cc. of Solution C.

After the medium was fully prepared we subjected it to a dehydration process which involved drying in the frozen state. The liquid medium was placed in a round bottom flask and frozen while rotating in an alcohol-Dry Ice mixture in such a manner that a shell of frozen basal media was formed on the inside of the flask. This flask was placed on a vacuum line connected to a low temperature condenser and was in this way evacuated.

The dried shell from the inside of the flask is packaged in powder form and distributed for use when needed. The powder may be reconstituted for use at the rate of 16.25 gm. dried liver residue powder medium, 10 gms. of glucose diluted to 250 cc. with distilled water.

In the foregoing example the medium was prepared for use in connection with *Lactobacillus casei* and for testing the presence of riboflavin. The same general process may be used in preparing a medium for use in connection with other bacteria and for testing other vitamins. In each case the nutrilites and vitamins necessary for the development of the specific bacteria are incorporated except for the vitamin to be tested.

Our process differs from those previously known in several ways. The initial difference lies in the use of an entirely different protein as the source of amino nitrogen. The liver residue material exhibits peculiar properties in the presence of the metallic salts which must also be added to the media. By separate experiments we have shown that magnesium sulfate, $FeSO_4$, and $MnSO_4$ each precipitate something as a simple admixture. This does not occur when casein hydrolysate is used as the source of amino nitrogen.

The precipitate thus formed in Solution A must be removed before the autoclaving step is attempted. If this is not done the precipitate forms during the autoclaving and must subsequently be filtered off. Such a procedure defeats the purpose of sterilization which autoclaving is intended to accomplish, and, unless it is so filtered, the product cannot be used in turbidimetric studies because of the cloudiness resulting from the precipitate.

Furthermore, a second autoclaving step is not feasible because of the labile nature of various components of the medium. In the type medium heretofore used where casein hydrolysate is the protein utilized the temperature approaches 121° C. (15 lbs. pressure). When using liver residue we have observed that the maximum time which can be allowed for sterilization without injury to the product is about 121° C. for ten minutes. A second autoclaving at such a temperature seriously decreases the vitality of the media. For this reason it is very advantageous to introduce the pre-heating and filtration steps before sterilization. Insofar as this preheating step is concerned, we recommend a time of 3 minutes at 100° C. Lower temperatures for shorter times may be employed.

The foregoing detailed description and specific examples have been given for explanation only and it is expected that the conditions and modes of operation may be varied greatly, all within the spirit of the invention.

What we claim and desire to secure in Letters Patent is:

1. In a process for preparing a vitamin assay medium, the steps of adding ferrous sulfate to an aqueous solution of trypsin hydrolyzed mammalian liver protein, heating the resulting solution to form an insoluble metal salt-protein precipitate, and removing the precipitate thus formed.

2. In a process for preparing a vitamin assay medium, the steps of adding manganese sulfate to an aqueous solution of trypsin hydrolyzed mammalian liver protein, heating the resulting solution to form an insoluble metal salt-protein precipitate, and removing the precipitate thus formed.

JOHN F. ROLAND, JR.
ANTHONY M. GROSS.

References Cited in the file of this patent

UNITED STATES PATENTS

| Number | Name | Date |
|---|---|---|
| 2,374,503 | Rudert | Apr. 24, 1945 |
| 2,400,710 | Piersma | May 21, 1946 |

OTHER REFERENCES

Pennington et al.: J. Biol. Chem., August 1940.

U. of Tex. Pub. No. 4137, pp. 11–13 (1941), by Snell et al.

U. of Tex. Pub. No. 4137, pp. 14–17 (1941), by Pennington et al.

Ind. and Eng. Chem., Anal, Ed., 1941, pp. 566–570, by Strong et al.

Annual Rev. of Biochemistry, 1943, pp. 556–7.